United States Patent Office 2,773,014
Patented Dec. 4, 1956

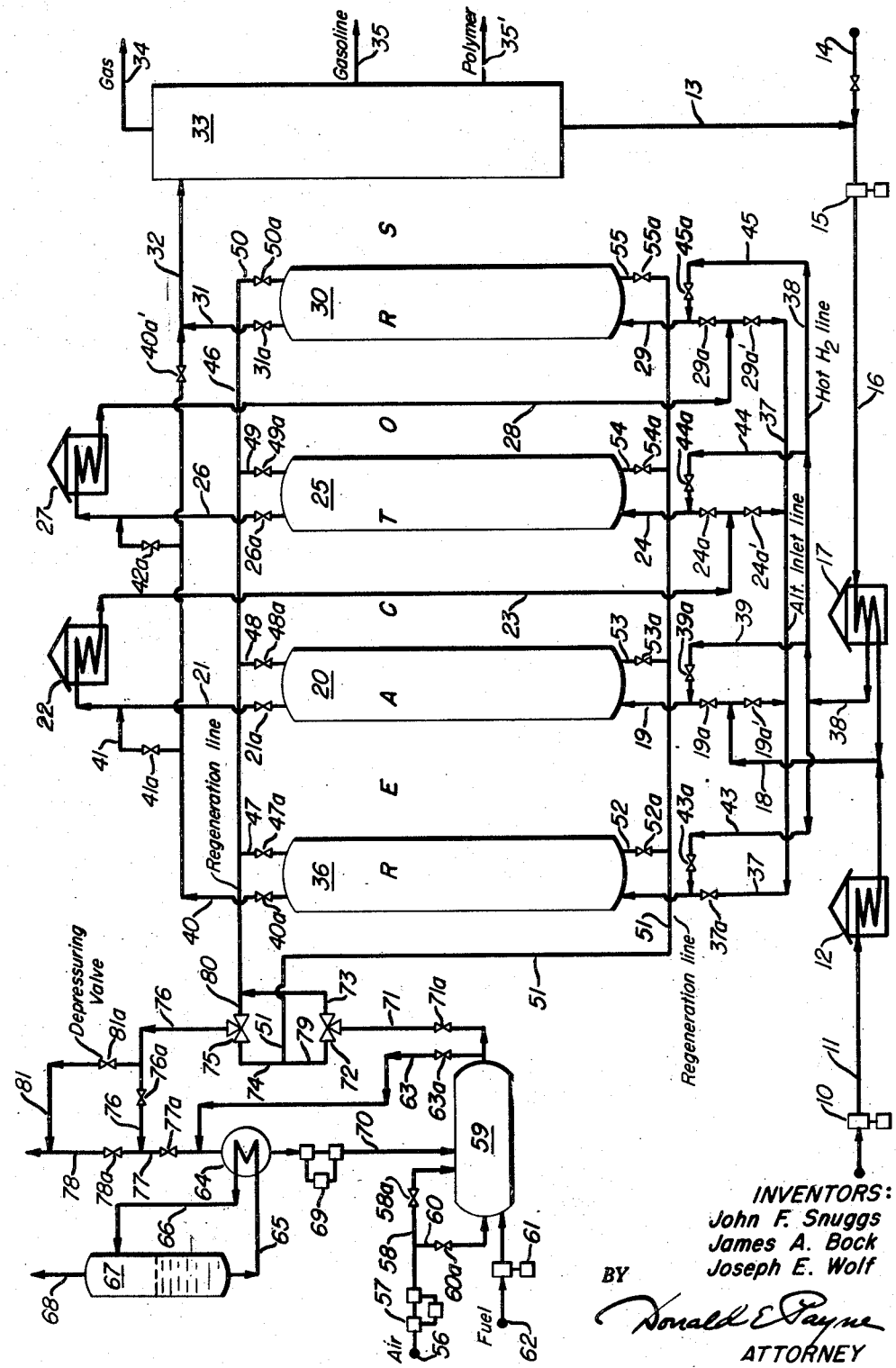

2,773,014

HYDROCARBON REFORMING WITH PLATINUM CATALYST AND REGENERATION SYSTEM THEREFOR

John F. Snuggs, Chicago, Ill., and James A. Bock, Crown Point, and Joseph E. Wolf, Hammond, Ind., assignors to Standard Oil Company, Chicago, Ill., a corporation of Indiana Application April 9, 1953, Serial No. 347,635

17 Claims. (Cl. 196—50)

This invention relates to hydrocarbon reforming with platinum catalyst and regeneration system therefor and it pertains more particularly to a regenerative system employing a platinum-on-alumina catalyst for converting a low sulfur low octane number naphtha rich in naphthenes and paraffins for obtaining very high yields of very high octane number naphtha.

For the past ten years naphtha has been reformed by the so-called hydroforming process which employs a molybdena-on-alumina catalyst, processes of this type being illustrated by U. S. 2,388,536, 2,357,332, 2,357,365, etc. In recent years the so-called platforming process has been adopted by many refiners, this process being characterized by the use of a fluorine containing platinum-on-alumina catalyst at pressures of at least about 500 p. s. i. g. and being non-regenerative in that reactors are on-stream for months and after each on-stream period the spent catalyst is replaced by fresh catalyst. Although patents purporting to describe platinum catalyst reforming operations such as U. S. 2,560,329 and 2,566,521 state that the platinum-containing catalyst can be regenerated by combustion of carbonaceous deposits therefrom, no such process has heretofore been commercially developed because it was found that such regeneration did not bring the catalyst back to its original state of activity and that after each such regeneration, catalyst activity declined more and more rapidly while at the same time falling to lower and lower levels so that it was the belief of those skilled in the art that a regenerative process could not successfully be employed with platinum-containing catalysts. The selectivity of catalysts regenerated by prior methods was also found to fall off sharply after a relatively short period of on-stream operations. An object of our invention is to provide an improved catalytic reforming system employing a platinum type catalyst which will enable the production from a given charging stock of larger yields of a product of given octane number (or substantially increased octane number for a given yield) than is obtainable by platforming and to provide an improved method and means for regenerating and rejuvenating such catalyst so that the system may operate continuously for a much longer perior of time without undue decline (or rate of decline) in catalyst activity or selectivity, the catalyst after each rejuvenation step being returned not only to its initial activity but being characterized by its initial selectivity and low rate of activity decline.

A further object of our invention is to provide an improved hydrocarbon reforming and catalyst rejuvenation and regeneration system of maximum flexibility at minimum investment cost and characterized by minimum operating expense. Other objects will be apparent as the detailed description of the invention proceeds.

In our system we provide four reactors of which at least three are on-stream and one is an alternate reactor, a charging stock heater and two reheaters, connecting lines and valves for passing charging stock through the charging heater, a first on-stream reactor, the first reheater, a second on-stream reactor, the second reheater, and a third on-stream reactor while the alternate reactor is undergoing regeneration and rejuvenation, a simple arrangement of connecting lines and valves being provided for substituting said alternate reactor for any one of the on-stream reactors when the latter require regeneration and rejuvenation. In sharp distinction from the hydroforming technique, the reactors are on-stream for a relatively long time period of twenty-four to forty-eight hours or more and the reactors do not necessarily undergo regeneration in any particular sequence. In other words the first reactor may be alternately on-stream and regenerated for several cycles before it is necessary to cut out the second on-stream reactor for regeneration and the third on-stream reactor may require even less frequent regeneration than the second on-stream reactor. The reactant flow through the system is always in the series: first reactor, first reheater, second reactor, second reheater and third reactor. The alternate reactor merely takes the place of one of the on-stream reactors when this is necessary or desirable. While three of the reactors are always connected for series flow operation, the alternate reactor is connected for parallel operation with a selected one of the reactors in said series. The connection for parallel operation is advantageous since the alternate reactor may actually be operated in parallel with any selected reactor in the series at such times that none of the reactors require regeneration.

An important feature of our system is our method and means for both regenerating and rejuvenating the catalyst in the reactor during the period when it is not on-stream. In hydroforming operations it was the practice to employ depressuring and repressuring steps which are not essential in our system. In hydroforming processes it was merely necesary to burn all carbonaceous material off the catalyst, then reheat the catalyst before reintroducing recycle hydrogen and again going on-stream; our process, however, requires a separate rejuvenation technique in which the catalyst, after substantially all carbon is removed therefrom, is contacted with a gas having a higher oxygen partial pressure than could be employed in the regeneration (carbon burning) step. For rejuvenation the catalyst should be treated with a gas having oxygen partial pressure of at least about .4 atmosphere (5 to 6 p. s. i.) and preferably in the range of about 1 to 4 atmospheres at a temperature which approximates the on-stream conversion temperature or about 950° F. to 1100° F. for a time sufficient to bring the catalyst substantially to its original state of activity, selectivity and rate of decline. Rejuvenation may be effected at temperatures up to 1200° F. or higher and a rejuvenation temperature of the order of 1000 to 1200° F. is even more effective for rejuvenating catalyst than lower temperatures of the order of 950° F.; however, when rejuvenation is effected above 1000° F. it is necessary that the catalyst bed be cooled before returning on-stream in order to prevent overtreating of the introduced charge with attendant cracking, carbon deposits and product degradation.

Our invention provides a flue gas generator which serves several functions: it generates flue gas for stripping hydrogen out of a reactor (when recycle flue gas is not available), it provides a heater for heating air to the temperatures required for rejuvenation during the rejuvenation part of the cycle and it provides a burner for consuming oxygen from rejuvenation gases so that the catalyst chamber may be filled with substantially oxygen-free flue gas before it is purged with hot recycle hydrogen prior to again going on-stream.

During the regeneration step, when flue gas containing a small amount of oxygen is being passed through a bed of spent catalyst with an inlet temperature of the order of 700 to 800° F., a flame front or combustion zone slowly traverses the catalyst bed. The amount of oxygen in the introduced gas is controlled to prevent this combustion front from exceeding about 1250° F. and it is preferably maintained at about 1050 to 1100° F. As the flame front progresses through the bed, the inlet end of the bed becomes cooler, approaching the temperature of the inlet gases, and the outlet end of the bed gets hotter because of heat picked up by gases at the combustion zone. In our process we make provision for reversal of flow during or between the regeneration, rejuvenation and flue gas purging steps so that the bed temperature may be maintained more nearly uniform and/or so that gradual heating or cooling of the bed may proceed from either end thereof. This feature is useful in bringing the bed after each operation to the optimum temperature pattern desired in the next operation.

Since the gas recirculation in the regeneration-rejuvenation system should not be called upon to operate at temperatures above about 1050° F., preferably not above 850° F., any recycled flue gas is cooled to such temperature and since it is desired to employ a higher temperature in the rejuvenation step, the additional heat is supplied by burning fuel in the flue gas generator.

The accompanying drawing, which forms a part of this specification, is a schematic flowsheet of a 9,000 barrel per day reforming plant embodying our invention.

The following example of our invention is by way of illustration rather than limitation. In this example the naphtha charge is a 58.2° API gravity Mid-Continent naphtha having an initial boiling point in ASTM distillation of 120° F., a 10 percent point of about 175° F., a 90 percent point of about 340° F. and a maximum of about 410° F. The charge contains only .05 weight percent sulfur and, in general, the sulfur content should be below about .1 percent. The charge has a clear F-1 octane number 46, F-2 octane number 45. The charge contains no olefins, about 40 percent naphthenes, 8 percent aromatics and 52 percent paraffins, all by volume.

Such charge is introduced by pump 10 and line 11 to heater 12 wherein the charge is vaporized and heated to a temperature of about 950° F. at a transfer line pressure of about 220 p. s. i. g. Recycle hydrogen from line 13 (or extraneous hydrogen from line 14) is introduced by compresser 15 and line 16 to heater 17 wherein it is heated to a temperature of about 1050° F. at about 220 p. s. i. g. and the combined streams pass through transfer line 18 and inlet line 19 to reactor 20, valve 19a being open and valve 19a' being closed. Reactor 20 contains about 10 tons of platinum-on-alumina catalyst in the form of one-eighth inch pills, the bulk density of the catalyst being about 60 pounds per cubic foot. The catalyst is preferably one which has been prepared by contacting an aqueous solution of chloroplatinic acid containing from about 3.5 grams of platinum per liter with an ammonium sulfide solubilizing agent for converting the platinum into a solubilized form of platinum sulfide in a stable aqueous solution, then combining this true or colloidal solution with hydrous alumina prepared as taught in U. S. Reissue 22,196, the relative amounts of the two components being such as to produce a final catalyst containing about .3 to .5 percent or more of platinum by weight on a dry $Al_2O_3$ basis, the resulting mixture being then dried and calcined. The alumina may contain up to approximately 1 percent by weight of fluorine (although it is preferably fluorine-free) and it may contain a small amount of titania but it should be substantially free from sodium, iron and molybdenum oxides since the latter have been found to poison the resulting catalyst. Other methods of preparing the alumina base may be employed but best results are obtained by using an alumina of the highest purity obtainable. Also other methods may be employed for incorporating the platinum but since these form no part of the present invention, they will not be described in further detail.

The dried and calcined catalyst in the reactor has previously been brought to reaction temperature and pressure by the circulation of a hot hydrocarbon and/or hydrogen gas therethrough, and if a hydrocarbon gas is employed for heating purposes, it is preferably purged from the system before the heated charging stock is introduced. The mixture of hot charging stock and hydrogen (the latter usually being a recycled gas containing about 80 to 90 mol percent hydrogen and employed at the rate of about 1,000 to 8,000, e. g. 4,000 standard cubic feet per barrel of charge) is introduced into reactor 20 at about 980° F. Due to the endothermic nature of the reaction, the partially converted charge is at a temperature of about 860° F. when it leaves the reactor 20 through line 21 (valve 21a being open) which leads to first reheater 22 wherein the partially converted charge is brought back to a temperature of about 980° F. It is then introduced by line 23 and inlet line 24 (valve 24a being open and valve 24a' being closed) to reactor 25 at an inlet pressure of about 200 p. s. i. g. Reactor 25 contains the same amount of the same type of catalyst as employed in reactor 20 and here again the reaction is endothermic, the partially converted charge at a temperature of about 900° F. being passed through line 26 (valve 26a being open) which leads to second reheater 27 wherein the partially converted charge is brought back to a temperature of about 980° F. It is then introduced by line 28 and inlet line 29 (valve 29a being opened and valve 29a' being closed) to the third reactor 30 which likewise contains the same amount of the same type of catalyst as employed in the prior reactors. Due to pressure drop in reactor 25, heater 27, etc. the inlet pressure to reactor 30 will be about 190 p. s. i. g. The final product stream leaves reactor 30 through line 31 (valve 31a being open) and line 32 to gas separation and product fractionation system 33.

In system 33 a recycle hydrogen stream is separated from condensed liquids, e. g. at about 170 p. s. i. g. and 105° F., the condensed liquid is fractionated and/or depropanized, the net gas production being withdrawn through line 34 and the reformed naphtha or gasoline being withdrawn through line 35. Any higher boiling material or "polymer" is withdrawn through line 35'. That portion of the separated hydrogen stream which is required for recycle is withdrawn through line 13 as hereinabove described. Since no invention is claimed in the gas separation or product fractionation system per se, it is unnecessary to describe it in any further detail.

After the system has been on-stream for one or more days there will be a decline in activity of the catalyst particularly in lead reactor 20. The extent to which product octane number falls off may be minimized by increasing the charge inlet temperatures to one or more of the reactors or decreasing the charge rate but with the 200 p. s. i. naphtha conversion in the presence of platinum-on-alumina catalyst maximum yield octane number relationships are obtained by periodically regenerating and rejuvenating the catalyst. The lead reactor may require such regeneration and rejuvenation more frequently than the final reactor and we have provided a system in which an alternate reactor 36 may take the place of any one of the on-stream reactors 20, 25 and 30 by a remarkably simple arrangement of valves and connections. Thus after about a day or two on-stream the fresh catalyst in alternate reactor 36 may be brought to conversion temperature (as hereinabove described), valves 41a, 40a, 37a and 19a' are opened (40a' being closed) so that the introduced charge may flow through line 37 to reactor 36 and valve 19a is closed. It will be observed that immediately prior to the closing of valve 19a, reactors 20 and 36 are, in fact, operating in parallel, both receiving preheated charge and hydrogen from line 18 and both discharging to the inlet of preheater 22. To displace or purge hydrocarbons from reactor 20 after valve 19a has been closed, hot recycle hydrogen from lines 38 and 39 is introduced to reactor 20 by opening valve 39a. When the purging of reactor 20 is complete, valves 39a and 21a are both closed. The charge to the first reheater is now coming from reactor 36 through lines 40 and 41, valves 40a and 41a being open and valve 40a' being closed.

In a similar manner alternate reactor 36 can take the place of reactor 25 by opening valves 24a' and 42a and closing valves 24a, 26a, 19a' and 41a. Alternate reactor 36 may take the place of reactor 30 by opening valves 29a' and 40a' and closing valves 29a, 31a, 24a and 42a. It will be noted that reactors 25 and 30 are connected for parallel operation with alternate reactor 36 and such parallel operations with either of these reactors may, of course, be continued during any period when none of the catalyst in the system requires regeneration. The hydrogen purge of reactor 36 is effected by opening valve 43a in line 43, the purging of reactor 25 is effected by opening valve 44a in line 44, and the purging of reactor 30 is effected by opening valve 45a in line 45. The hot hydrogen for effecting such purging steps may be a portion of such recycle hydrogen which does not pass through heater 17 or it may be a part of the recycled hydrogen which has passed through only a part of the heating coils in heater 17 (as shown).

Referring next to the regeneration and rejuvenation system, we provide an upper regeneration gas line 46 with connections 47, 48, 49 and 50 to reactors 36, 20, 25 and 30 respectively. Similarly we provide a bottom regeneration gas line 51 with connections 52, 53, 54 and 55 to reactors 36, 20, 25 and 30 respectively. Each of the regeneration gas connecting lines leading to a reactor is provided with a valve designated by the connection line reference character followed by "a," e. g. 47a, 48a. In connections leading to on-stream reactors these valves are, of course, closed.

Air for flue gas preparation, regeneration and rejuvenation is supplied from source 56 by compressor 57 which compresses it to a pressure up to about 220 p. s. i. g. The compressed air may be introduced through line 58 and valve 58a to a down stream portion or secondary combustion area of flue gas generator 59 and/or the compressed air or portion thereof may be introduced through line 60 in valve 60a to the inlet end or primary combustion area of the flue gas generator along with fuel gas introduced by compresser 61 from source 62. A pilot flame or other ignition device (not shown) is provided in the primary combustion zone and the proportion of fuel gas introduced by compresser 61 to air introduced by line 60 is controlled to give efficient combustion. During start up operations all air is introduced through line 60 for generation of flue gas which leaves vessel 59 through line 63 (valve 63a being open and valve 71a being closed) through heat exchanger 64 wherein the flue gas is cooled to about 850° F. by water from line 65 for generation of steam which is discharged by line 66 to separator 67, the net steam production being discharged through line 68 (water inlet not shown). The cooled flue gas in returned by circulating compresser 69 and line 70 to flue was generator 59, this operation being continued till the pressure in the flue gas generator reaches approximately 220 p. s. i. g. at which time the temperature of the flue gas due to circulation through the cooler will not substantially exceed about 850° F.

At this stage valve 71a is opened and the flue gas is passed by line 71 through three-way valve 72 and lines 73, 46 and 48 to the top of reactor 20 (assuming that this reactor is to undergo regeneration and that valves 19a, 39a and 21a are closed). The flue gas flows downwardly through the reactor and purges out hydrogen, the purged gas being withdrawn through lines 53 (valves 53a aand 48a being open), 51 and 74 through three-way valve 75 to line 76 (valve 76a being open) to line 77 until the pressure in line 77 is sufficient to open valve 78a which may be set to open at about 210 p. s. i. g. for venting gases through line 78. Hence the pressure in line 77 thus reaches the desired operating pressure. Valve 77a is opened and valve 63a may be closed since the desired cooling may now be effected by gas which is recycled from line 77 through cooler 64 and circulating compresser 69 to the flue gas generator. It may be desirable to vent the bulk of the purged hydrogen through line 78 before opening valve 77a and closing valve 63a.

The circulation of flue gas through the reactor is continued while the introduction of fuel and air to vessel 59 is substantially eliminated so that the temperature of the catalyst bed in reactor 20 is not only purged from hydrogen but is brought to a temperature of about 850° F. At this stage a small amount of air is introduced into the circulating stream in amounts controlled by valve 58a to initiate combustion of carbonaceous deposits on the catalyst, the amount of introduced air being controlled to prevent the combustion front from substantially exceeding about 1050° F. The combustion front thus slowly traverses the reactor bed, the net volume of produced gases being vented through line 78 and the circulating stream being cooled to a temperature in the range of about 700 to 850° F. by heat exchanger 64. When the combustion front has completely traversed the bed the catalyst is fully regenerated in that all carbonaceous deposits have been burned and most of the bed is at a temperature not substantially higher than about 850° F. The circulating stream during regeneration has an oxygen partial pressure not substantially exceeding .3 atmosphere (i. e. about 2 percent oxygen in recirculating flue gas).

While the regeneration of platinum type catalyst will bring its selectivity and activity substantially back to its original level, regeneration alone is not adequate because after long periods on-stream it is found that activity falls off at much more rapid rates and that there is a sharp increase in selectivity decline. In order to maintain the catalyst at high activity and selectivity, to prevent an unduly rapid rate of activity decline and to insure against any loss in yield-octane number relationship we next effect a rejuvenation of the catalyst. This rejuvenation is effected by increasing the oxygen partial pressure of the circulating gas to at least .4 atmosphere and preferably to about 1 to 4 atmospheres and increasing the temperature of the catalyst bed to at least reaction temperature and preferably to a temperature of about 950 to 1200° F., e. g. 1050° F. At this stage sufficient fuel gas is introduced into vessel 59 with the required amount of air through line 60 to markedly increase the temperature of the circulating gas stream and additional air is introduced through line 58 to markedly increase the oxygen partial pressure in the circulating stream. For best results valve 77a is closed and a hot compressed air is passed through the catalyst bed diluted with only the amount of flue gas which is produced by the necessary combustion of fuel to heat the compressed air to the rejuvenation temperature. Flue gas dilution of the compressed air may be eliminated by provision of a fired indirect air heater but usually this separate equipment is unnecessary in 200 p. s. i. g. operations since the amount of flue gas dilution in the air heating step does not lower the oxygen partial pressure below operable limits. The passage of hot compressed air through the catalyst bed is preferably continued until the entire bed temperature is elevated to above 950° F. and is preferably elevated to about 1050° F. When the bed temperature reaches this level the rate of heated compressed air introduction may be markedly reduced since it is only necessary that the catalyst be in contact with the hot oxygen at the defined oxygen partial pressure for the necessary time to insure rejuvenation, the gas flow for heating and temperature maintenance being sufficient for any required sweeping action. The time will depend upon the particular catalyst, charging stock, etc. and on the lengh of time and/or number of cycles the catalyst has been on-stream. A catalyst which is 50 percent deactivated requires a much longer time than a catalyst which is only 5 to 10 percent deactivated. For relatively fresh catalyst which is deactivated only to a slight extent rejuvenation may be effected in a matter of 5 or 10 minutes while with a catalyst which has been used a long period of time and has been deactivated to a greater extent the rejuvenation time may be 10 hours or more, badly deactivated catalysts having been rejuvenated for as long as 24 hours. It is preferred to rejuvenate the catalyst before its activity or selectivity has appreciably declined in which case effective rejuvenation may be obtained by contact with oxygen having a partial pressure of about 1 to 4 atmospheres at a temperature in the range of 950 to 1100° F. for a time of about .1 to 10 hours, e. g. about 5 hours.

When rejuvenation has been complete the catalyst must next be purged from oxygen before hydrogen is reintroduced thereto. The oxygen purge is effected by discontinuing the introduction of air through lines 58 and 60, introducing fuel gas by compressor 61 and opening valve 77a so that the oxygen in the circulating gas stream is all burned by introduced fuel gas and flue gas is once more being cycled through the catalyst bed. During this oxygen purge step the temperature of the circulating gases may be lowered by heat exchanger 64 so that the reactor bed temperature is brought back to conversion temperature when rejuvenation is effected at a higher temperature. At the time of the oxygen purge it is preferred to reverse the flow of the gas stream through the reactor bed and this is accomplished simply by switching the position of valves 72 and 75 so that gases from line 71 will flow through lines 79, 51 and 53 into the bottom of vessel 29 and gases from the top thereof flow through lines 43, 46 and 80 to discharge line 76. The oxygen purge may be discontinued when the lower part of the catalyst bed is at about reaction temperature even though the upper part of the bed is slightly above reaction temperature.

After the oxygen purge is completed and the circulating gas, now flowing from the bottom to the top of the reactor, is oxygen-free flue gas valve 71a is closed and valve 63a is opened, valve 53a is closed and valve 39a is opened to purge the flue gas out of the reactor with hot recycle hydrogen. This so-called hydrogen purge of flue gas is continued until substantially all flue gas is eliminated through line 43 after which time valves 39a and 43a may be closed and the reactor is ready to go on-stream by opening valves 21a and 19a and closing valves 19a' and 41a. While reactor 29 is on-stream the alternate reactor 36 may be regenerated and rejuvenated in the manner above described so that it may subsequently again replace reactor 29 or replace reactor 25 or 30.

If desired the purging steps may be effected at reduced pressure by opening valve 81a in line 81, which leads to vent line 78, and closing valve 76a. It is not essential, however, that any of the operations be at reduced pressure and a pressure of at least 100 p. s. i. g. and preferably at least about 200 p. s. i. g. is required for optimum reaction and rejuvenation, such pressure being advantageous also for the regeneration step.

The described arrangement of valves 72 and 75 enables simple and expeditious reversal of flow through a catalyst bed which is undergoing regeneration-rejuvenation and/or purging substantially instantaneously and as frequently as may be advantageous or desirable. The optimum method of operation will be somewhat dependent on the amount of carbonaceous deposits to be burned in the regeneration step and operating temperatures, oxygen concentrations, etc. but with the system hereinabove described we are enabled to attain maximum flexibility.

As employed herein the term "activity" is the catalyst's property of directing the conversion to a product of the desired high octane number in the range of about 90 to 100 at the defined temperature, space velocity and operating pressure. Relative activity has reference to activity of fresh catalyst. Thus if it requires twice as much used catalyst to produce the octane number from a given charge attainable by a given amount of fresh catalyst at the same temperature, pressure and charge rate, the relative activity of the used catalyst is 50 percent. Activity may also be defined by improvement of octane number; i. e. a catalyst which converts a 45 octane number naphtha to a 95 octane number product is more active than one which converts such naphtha to a product of only 90 octane number under the same operating conditions. Activity may also be measured by the temperature required to produce a given octane number; a catalyst which will produce a 95 octane number product at 920° F. is more active than a catalyst which requires 950° F. to produce the same octane number under the same operating conditions of pressure and space velocity and with the same feed stock.

Selectivity of the catalyst is its property of limiting the conversion to dehydrogenation, aromatization and isomerization as opposed to cracking, disproportionation and the formation of gas, coke and higher boiling materials. A catalyst of high selectivity should produce at least about 90 percent by weight of $C_3$-free 400° F. end point gasoline from a charging stock as hereinabove defined. Without rejuvenation, a catalyst which has been used for a number of days (particularly in later cycles of operation) loses its ability to direct the conversion in the desired channel and results in formation of large amounts of hydrocarbon gases, coke, polymer, etc. Loss in activity may be balanced by use of higher temperatures and/or lower space velocity but loss of selectivity inevitably means loss of valuable product. The system hereinabove described is designed to not only maintain the catalyst at high activity but also to prevent loss of selectivity during continuous repeated cycles of on-stream reaction, regeneration and rejuvenation. The plant operator can readily determine by the temperature drop across each reactor and the quality of the reactor effluent whether or not the activity and selectivity of the catalyst therein has decreased to such an extent that regeneration and rejuvenation are advisable. The length of on-stream runs in each reactor will depend upon the nature of the catalyst, the composition of the charging stock, the severity of the treatment and other variables but, generally speaking, a catalyst bed should not remain on-stream if its relative activity has dropped more than 50 percent or if it converts as much as 10 weight percent of the naphtha charge to products other than high octane number $C_3$-free 400° F. end point gasoline.

It will be observed from the foregoing that combustion furnace 59 serves the multiple function of generating flue gas for purging operations, supplying flue gas diluent for regeneration, heating air for the rejuvenation step and purging oxygen from the circulating gas stream after rejuvenation. A separate air heater may be employed for the air heating step so that the rejuvenation air will not be diluted with flue gas but ordinarily a sufficiently high oxygen partial pressure can be obtained by operating in the manner hereinabove described with chamber 59 serving the function of an air heater.

From the foregoing description it will be seen that we have accomplished the objects of our invention and while we have illustrated the invention by a specific example, it should be understood that alternative arrangements, operating procedures and conditions will be apparent to those skilled in the art. Thus in this example the on-stream conversion, regeneration, rejuvenation and purging steps are all effected at approximately 200 p. s. i. g. and it should be understood that the regeneration, rejuvenation and purging steps need not be at the same pressure as the conversion step and that the conversion step may be above or below 200 p. s. i. g. although it is preferably within the range of about 100 to 350 p. s. i. g. In this example the on-stream space velocity in each reactor is approximately 5 pounds of liquid charge per hour per pound of catalyst but this space velocity may range from about 2 pounds of charge per hour to 10 pounds per hour per pound of catalyst depending on the activity of the particular catalyst. The temperature at which charge enters the reactor may be higher or lower than 980° F. but is preferably in the range of about 950 to 1000° F. The regeneration and rejuvenation steps may require more or less than the times hereinabove described but about 1 to 10 hours is the preferred range for each of these treatments. In some cases rejuvenation may be effected at temperatures lower than 950° F. particularly with long contact time and high oxygen partial pressure.

The reforming plant hereinabove described is designed to produce from the defined charging stock about 6.2 weight percent of hydrogen and $C_3$ and lighter hydrocarbons, 92.4 weight percent of $C_3$-free 400° F. end point hydroformate, 1.3 weight percent of higher boiling liquid product (usually called polymer) and less than .1 percent coke. Of the $C_3$ and lighter gases, about 90 mol percent is hydrogen and the remainder about equal mol percents of $C_1$, $C_2$ and $C_3$ hydrocarbons. Of the hydroformate about 2 percent is isobutane, 3 percent normal butane and 95 percent $C_5$-400° F. gasoline having an API gravity of about 48.6°, an F-1 clear octane number of about 93, an initial ASTM boiling point of about 115° F., 10 percent point of 165° F., 50 percent point of 255° F. and 90 percent point of 340° F. The so-called polymer has an API gravity of about 11° and boils in the range of about 420 to 700° F.

The product yield and octane number is, of course, somewhat dependent on the charge employed and the nature of the catalyst and the severity of the treatment. For example, a hydroformer charge boiling between about 212° F. and 400° F., containing .03 weight percent sulfur and comprised of about 50 volume percent naphthenes, 36 volume percent paraffins, 13 volume percent aromatics and 1 volume percent olefins, may yield under substantially the above defined conditions almost 15 percent $C_3$ and lighter gases, 81 percent $C_4$-400° F. end point product gasoline and about 4 percent polymer. The gasoline product in this case being a clear research octane number of approximately 100.

It should be understood, of course, that various other features may be included in the process design. Provision may be made in line 76 for removing any catalyst fines which may be carried out of the reactors with purged gas, regeneration gas, etc., cyclone separators, filters or other separation means being effected for this purpose. Since the gas velocity is greatest during the on-stream period, catalyst fines may be carried overhead with reaction products and recovered from the high boiling components thereof in any known manner. Provision may be made for introducing into furnace 22 or 27 a charging stock which does not require the full three reactor system in which case, of course, these furnaces must be designed to provide the required heat for vaporizing and heating such extraneous stocks to the defined temperatures in the range of about 950 to 1000° F. The charging stock may be pre-fractionated to insure removal of water, $H_2S$ and/or components boiling above 400° F. end point and, if the charge has a high sulfur content, it may be hydrodesulfurized or hydrofined in a conventional manner to lower its sulfur content and/or remove any other impurities which might be detrimental to the platinum-on-alumina catalyst.

We claim:

1. A regenerative, platinum-catalyst, naphtha hydroforming system which comprises at least four reactors herein called alternate, first, second and third reactors respectively, each adapted to contain a bed of platinum catalyst, a lower regeneration gas line, a connection including a valve between the bottom of each reactor and said lower regeneration gas line, an upper regeneration gas line, a connection including a valve between the top of each reactor and the upper regeneration gas line, a regeneration system connected to said lower and upper regeneration gas lines, a charging stock heater, first reheater and second reheater respectively, an inlet at one end of each reactor and an outlet at the other end thereof, a charging stock heater discharge line alternately connected by lines each containing a valve to discharge only to the alternate reactor and the first reactor inlets, a first reheater discharge line connected by lines each containing a valve to discharge only to the alternate reactor and the second reactor inlets, a second reheater discharge line connected by lines each containing a valve to discharge only to the alternate reactor and the third reactor inlets, a first reheater inlet line connected by lines each containing a valve to receive effluent from the outlets of only the alternate reactor and the first reactor, a second reheater inlet line connected by lines each containing a valve to receive effluent from the outlets of only the alternate and second reactor, a gas separator having an inlet connected by lines each containing a valve to receive effluent from the alternate reactor and the third reactor, whereby a naphtha charge flows in series through the heater, first reactor, first reheater, second reactor, second reheater, and third reactor to the gas separator while catalyst in the alternate reactor is undergoing regeneration and whereby the alternate reactor may be connected in parallel with any selected one of the first, second and third reactors respectively and take the place thereof in any desired sequence so that any selected reactor may be taken off stream for regeneration without interrupting charging stock flow through the system or changing the order of said flow through the preheaters of the system.

2. The system of claim 1 which includes valve connections between the upper and lower regeneration gas lines and the regeneration system whereby the flow of gas through each reactor during regeneration may be alternated in direction.

3. The system of claim 1 wherein the regeneration system includes a gas cooler, a gas circulator, a gas heater, connections for passing gas from one of the regeneration gas lines through the cooler, compressor and heater to the other of said regeneration gas lines for establishing a circulating gas stream and a connection for introducing air into the circulating gas stream.

4. A regenerative, platinum-catalyst, naptha hydroforming system which comprises at least four reactors, each containing a bed of such catalyst and each having valved inlet lines and outlet lines of which at least three reactors are normally on stream and one is an alternate reactor, at least three heaters each having its respective transfer line, connecting lines for passing naphtha charging stock through the first heater to the first reactor inlet line, thence from the first reactor outlet line through the second heater to the second reactor inlet line, thence from the second reactor outlet line, through the third heater to the third reactor inlet line and thence from the third reactor outlet line ultimately to the inlet of a gas separator while catalyst in the alternate reactor is undergoing regeneration, and apparatus for substituting said alternate reactor for any selected one of the on-stream reactors whereby catalyst in the latter may undergo regeneration, which apparatus comprises a valved connection between the alternate reactor inlet line and each of said transfer lines, and valved connections between the alternate reactor discharge line and each of the other reactor outlet lines, whereby the naphtha continuously flows in the same sequence through the three heaters and only the alternate reactor can be connected in parallel with or in place of any selected one of the on-stream reactors.

5. The system of claim 4 which includes a regeneration gas heater, and connecting lines and valves for passing an oxygen-containing gas through said heater and thence through any selected one of said reactors which is not connected in on-stream position.

6. The system of claim 5 which includes a valved connection for introducing hot hydrogen into any selected reactor while no naphtha is being introduced thereto through the valved inlet thereof.

7. The system of claim 4 which includes a gas cooler, a gas heater, a gas circulator, connecting lines and valves for circulating gas from one end of a selected reactor through said cooler, heater and circulator back to the other end thereof to form a circulating stream, a connection for introducing air into the circulating stream, and a connection for venting gas from the circulating stream.

8. The system of claim 4 which includes a product separator connected to the last on-stream reactor, a recycle gas heater, a line for conveying gas from the product separator to said recycle gas heater and a line for conveying heated gas from said recycle gas heater to the charge introduced to the first on-stream reactor.

9. A regenerative platinum-catalyst naphtha hydroforming system containing first, second, last and alternate reactors respectively, a preheater, a first reheater, a last reheater, a product separator, connections for passing naphtha in series flow through the preheater, first reactor, first reheater, second reactor, last reheater, last reactor and product separator, connections for introducing hydrogen from the separator to charge entering the first reactor, a connection from the transfer line of the last reheater for selectively passing its contents to the alternate reactor, a connection from the alternate reactor for passing effluent therefrom to the product separator, the alternate reactor thus being connected in parallel with the last reactor, valves in the connections entering and leaving the last reactor and the alternate reactor arranged so that all material from said transfer line can be passed through either one of said reactors and the other of said reactors can be isolated for regeneration, a gas cooler, compressor and heater, regeneration connections from one end of the last and alternate reactors to said cooler and thence to said compressor and thence to said heater and thence to the other end of said reactors whereby a regeneration gas stream may be circulated through the heater and the reactor during regeneration, a connection for introducing air into said stream whereby it may be heated by said heater, said regeneration connections containing valves for isolating one reactor for regeneration from the other reactor which is on-stream whereby the alternate reactor may be substituted for the last reactor in the series flow between the last reheater and the product separator when the last reactor requires regeneration, the last reactor may be similarly substituted for the alternate reactor, and the last reactor and the alternate reactor may be operated in parallel.

10. The system of claim 9 which includes a valve connection between the transfer line of the first reheater and the inlet of the alternate reactor, a valve connection between the outlet of the alternate reactor and the outlet of the second reactor, and regeneration connections from one end of the second reactor to said flue gas cooler, compressor and heater and from said flue gas heater to the other end of the second reactor whereby the alternate reactor may be substituted for the second reactor while the second reactor is undergoing regeneration.

11. The system of claim 9 which includes a valved connection for introducing hydrogen at the charge inlet of each reactor at periods when neither regeneration gases nor naphtha charging stock is introduced thereto.

12. The system of claim 9 which includes a separate hydrogen heater as a part of the connections for introducing hydrogen from the separator to charge entering the first reactor.

13. In a platinum-catalyst, naphtha hydroforming process wherein a naphtha charge of low sulfur content is preheated and introduced with preheated hydrogen to a first reaction zone, effluent from the first zone is reheated and introduced into a second reaction zone, effluent from the second zone is reheated and finally introduced into a last reaction zone from which it is passed through a cooling zone to a separation zone and hydrogen is recycled from the separation zone through a preheating zone for introduction to the first zone, the improved method of operation which comprises periodically connecting any selected reaction zone in parallel with an alternate reaction zone of approximately the same size as the first, second and last reaction zones respectively, each of the reaction zones containing a bed of supported platinum catalyst, blocking off the selected reaction zone to take it off stream while the alternate zone takes its place in the on-stream sequence, purging hydrogen from the off-stream reaction zone, then regenerating catalyst in the off-stream reaction zone by burning carbonaceous deposits therefrom with a gas having a low oxygen content, then purging oxygen from the off-stream zone and thereafter replacing the purge gas with hydrogen, then placing the selected reaction zone back on stream and thereafter taking the alternate reactor off stream, and in the same manner replacing other of the first, second and last reaction zones with the alternate reaction zone in any desired sequence so that each of the reaction zones including the alternate may undergo regeneration while in off-stream position without interrupting the on-stream flow and without changing the sequence of flow through the preheating and the two reheating steps.

14. The method of claim 13 which includes the step of contacting the catalyst in the off-stream zone after the regeneration step with a gas of higher oxygen content and heating said gas to a higher temperature than the oxygen content and inlet temperature respectively of the regeneration gas.

15. The method of claim 13 which includes the step of generating flue gas for use in at least one of said purging steps, passing said flue gas through a cooler, compressor and heater for initial use, and passing a part of the combustion products produced in the regeneration step through the cooler, compressor and heater to provide diluent gas during at least a part of the regeneration step.

16. The method of claim 13 which includes the step of introducing into a reaction zone in off-stream position, after oxygen has been purged therefrom, a hydrogen gas from the separation zone which has been heated to a lower temperature than the preheated hydrogen which is introduced into the first reaction zone.

17. The method of claim 13 wherein the pressures in the on-stream reaction zones are within the range of about 100 to 350 p. s. i. g.

References Cited in the file of this patent

UNITED STATES PATENTS

| | | |
|---|---|---|
| 2,253,486 | Belchetz | Aug. 19, 1941 |
| 2,310,244 | Lassiat | Feb. 9, 1943 |
| 2,366,372 | Voorhees | Jan. 2, 1945 |
| 2,367,365 | Munday et al. | Jan. 16, 1945 |
| 2,487,717 | Maker et al. | Nov. 8, 1949 |
| 2,488,033 | Johnson | Nov. 15, 1949 |
| 2,505,263 | Trotter | Apr. 25, 1950 |
| 2,573,149 | Kassel | Oct. 30, 1951 |
| 2,578,704 | Houdry | Dec. 18, 1951 |
| 2,606,862 | Keith | Aug. 12, 1952 |
| 2,654,694 | Berger et al. | Oct. 6, 1953 |
| 2,664,404 | Blatz et al. | Dec. 29, 1953 |